A. HYDE.
Belt-Fasteners.
No. 140,419.
Patented July 1, 1873.
Fig. I
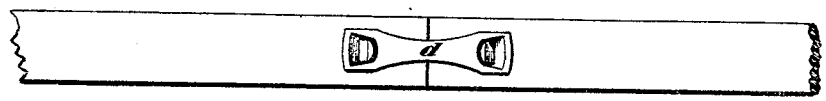
Fig. II
Fig. III
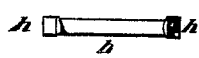
Fig. IV
Witnesses
Inventor,
Andrew Hyde
by his Attorneys
Gardiner & Hyde

UNITED STATES PATENT OFFICE.

ANDREW HYDE, OF SPRINGFIELD, MASSACHUSETTS, ASSIGNOR OF ONE-HALF HIS RIGHT TO JOHN W. TRAFTON, OF SAME PLACE.

IMPROVEMENT IN BELT-FASTENERS.

Specification forming part of Letters Patent No. 140,419, dated July 1, 1873; application filed March 20, 1873.

*To all whom it may concern:*

Be it known that I, ANDREW HYDE, of Springfield, Hampden county, State of Massachusetts, have invented an Improved Belt-Hook, of which the following is a specification:

My invention consists of the combination of a bar connecting two peculiarly-formed hook-ends with a yoke so constructed as to be easily sprung over the said ends to firmly secure them, the hook proper and the yoke, when so united, forming in effect one piece; the object of the invention being to afford the means of easily and firmly joining the ends of belting by inserting the hooks through holes formed in the belt for the purpose, and securing their projecting ends by the yoke, the belt, when so fastened, being clamped on one side by the bar and on the other by the yoke, and so held that the fastening cannot become detached by its passage over the smallest pulley.

In the drawing, Figure I is a top view of my device in place in the belt. Fig. II is a longitudinal section of the complete hook, and Figs. III and IV are detail views.

The bar $b$ has the spring-hook ends $h\,h$, which leave the bar at a right angle, or convenient approximation thereto, and slightly exceed in length the thickness of the belt upon which they are to be used. The parts of ends $h\,h$, that would consequently project from the surface of the belt when the ends were inserted therein and the bar $b$ brought against the belt and across the joint, are formed substantially as shown in Fig. II, so as to have notches on their outer sides and beneath heads beveled toward said notches. The hooks $h\,h$, which, with the bar $b$ and yoke $d$, I prefer to form of metal, steel being best adapted for the purpose, when in place through the belt, have the yoke $d$ sprung by pressure over their projecting notches, the yoke bearing its entire surface against the belt, and together with the bar $b$ and ends $h\,h$ constituting a rigid connection to the ends of the belt; and any pressure upon the pulley by bar $b$ tends to hold the notches in ends $h\,h$ more firmly against the yoke. The yoke is formed with openings in its ends to pass over the heads of ends $h\,h$, and has stock removed to leave a beveled edge to engage the notches in said ends, while the thickness of the yoke enables the heads to be so recessed within the yoke as to be removed from the possibility of being caught by any foreign substance.

By these means I form a simple and effective belt-hook, and one that can be quickly adjusted and secured without requiring any special tool.

What I claim is—

The device for joining the ends of belting, consisting of the bar $b$ with its spring-hook ends $h\,h$, in combination with the yoke $d$, the parts being constructed substantially as shown and described.

ANDREW HYDE.

Witnesses:
   R. F. HYDE,
   M. W. TRAFTON.